Jan. 30, 1968     P. KARLAN     3,365,988

ADJUSTABLE CUTTER

Filed Nov. 12, 1965     2 Sheets-Sheet 1

Jan. 30, 1968  P. KARLAN  3,365,988
ADJUSTABLE CUTTER
Filed Nov. 12, 1965  2 Sheets-Sheet 2
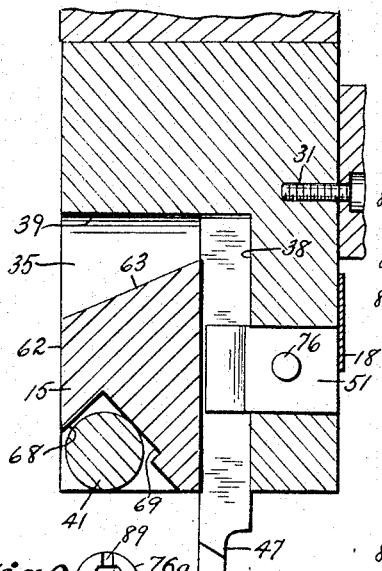
Fig.5
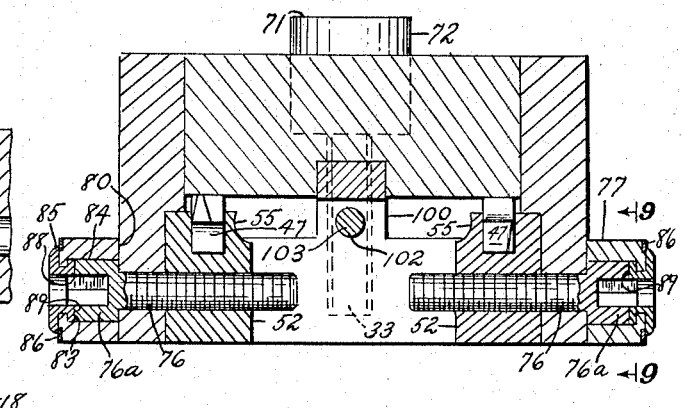
Fig.6
Fig.9
Fig.10
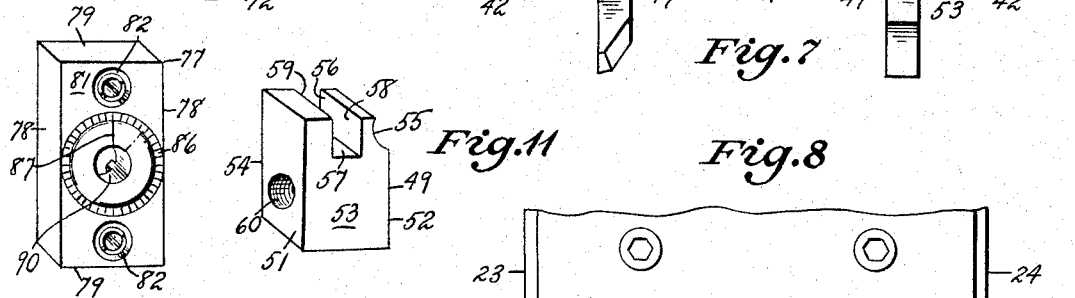
Fig.7
Fig.11  Fig.8
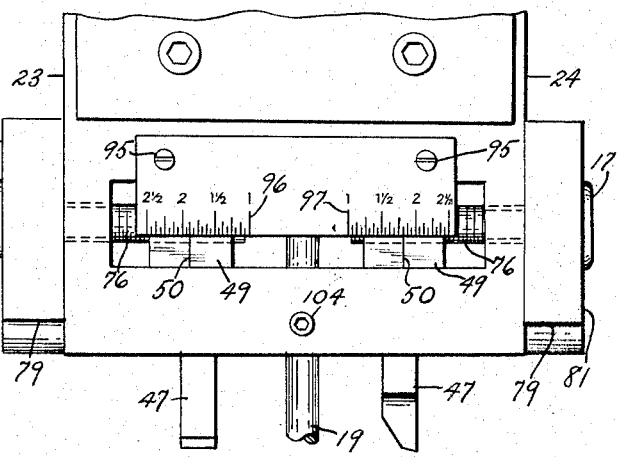
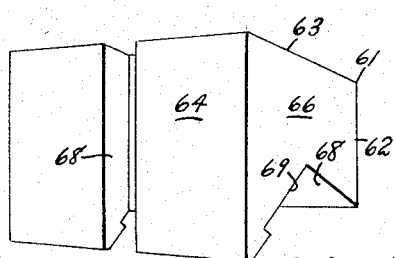
Fig.12
Fig.13 tes Patent Office 3,365,988
Patented Jan. 30, 1968

3,365,988
ADJUSTABLE CUTTER
Paul Karlan, Mount Vernon, N.Y.
(620 Ogden Ave., Mamaroneck, N.Y. 10543)
Filed Nov. 12, 1965, Ser. No. 507,394
3 Claims. (Cl. 77—79)

ABSTRACT OF THE DISCLOSURE

An adjustable cutter for drilling, boring and trepanning operations having threadedly adjustable tool holding means, and clamping means having a line of action perpendicular to the principal axis of said threadedly adjustable means for maintaining a given adjustment.

---

Figure 1:
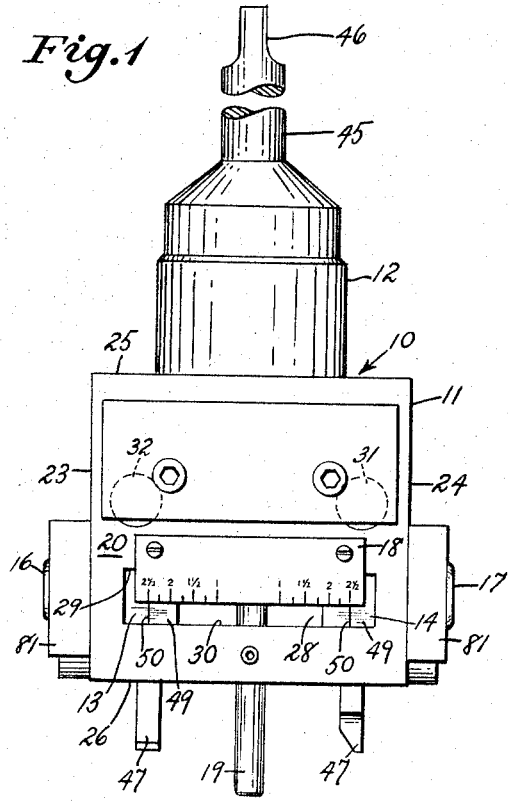

This invention relates generally to the machine tool art, and more particularly to an improved adjustable cutter suitable for use in conjunction with drilling, boring, routing and trepanning operations with only relatively minor adjustments. Reference is made to prior Patent No. 3,127,663, granted Apr. 7, 1964, the present disclosure relating to an improved construction in devices of the same general type.

It is known in the art to provide a wide variety of milling and boring cutters adapted to perform specific machining operations of given dimension. These cutters are relatively costly, and where the same are used only occasionally, it is difficult to justify the expensive purchase of the same. Many smaller machine shops are seriously handicapped in that it often becomes necessary to purchase cutters of fixed diameter that are difficult to resharpen without special equipment.

In the above-mentioned Patent No. 3,127,663 there is disclosed a device, the use of which solves the above problems, but which has been limited in use owing to the difficulty of using the same to machine openings of diameters corresponding to those obtainable with various combinations of fixed spacing members employed. Often, for example, it is sometimes desirable to bore a hole a few thousandths oversized or undersized, or to rebore an existing hole several thousandths oversize. Owing to the fixed limitations of the spacing members employed by the prior device, it has not been possible to perform this type of machining operation.

It is therefore, among the principal objects of the present invention to provide an improved tool of the class described capable of accurate adjustment to extremely fine tolerances.

Another object of the invention lies in the provision of an improved rotary machining cutter which may be used over a wide range of dimensions, thereby substantially reducing the inventory of cutters which must be maintained on hand at any given time.

A further object of the invention lies in the provision of an improved rotary machining cutter which may be used in conjunction with existing machine tools, as for example milling machines, boring machines, lathes, and drill presses.

Still another object of the invention lies in the provision of a device of the class described in which the cutter elements may be removed for replacement to adapt the device for differing machining operations, or similar machining operations to different dimensions.

A further object of the invention lies in the provison of a device of the class described in which the cost of fabrication may be of a reasonably low order, with consequent wide sale, distribution, and use.

A feature of the invention lies in the extreme rigidity and strength of the device, whereby relatively heavy machining loads may be taken.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 2:
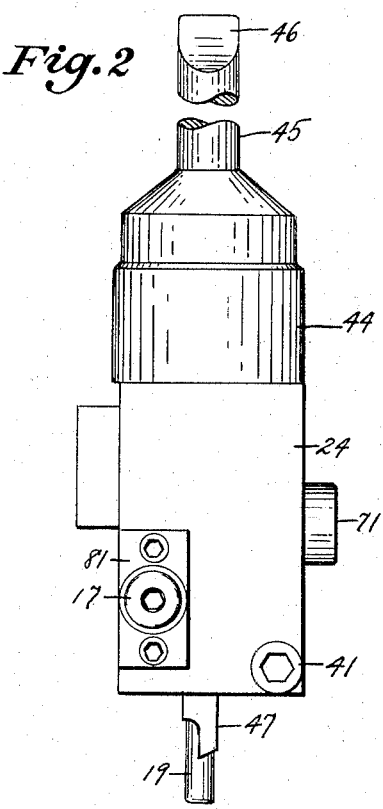
Figure 3:
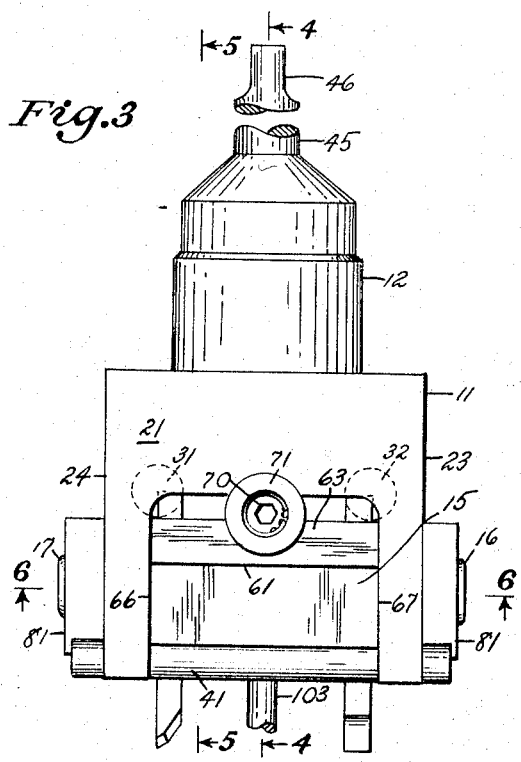
Figure 4:
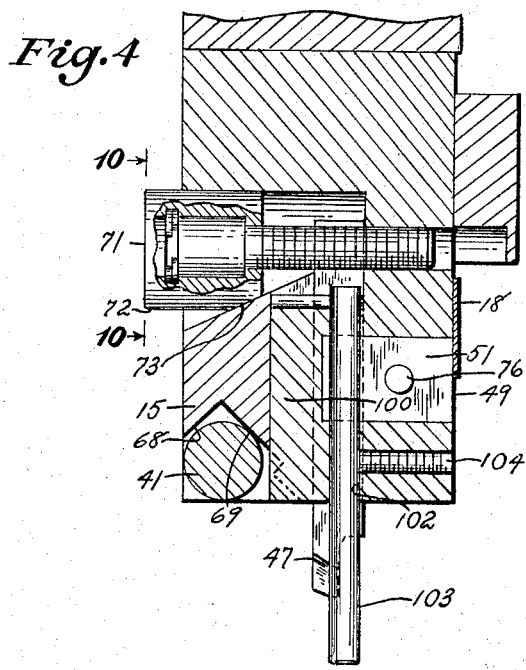

FIGURE 1 is a front elevational view of an embodiment of the invention.
FIGURE 2 is a side elevational view thereof.
FIGURE 3 is a rear elevational view thereof.
FIGURE 4 is a fragmentary vertical sectional view as seen from the plane 4—4 in FIGURE 3.
FIGURE 5 is a vertical sectional view as seen from the plane 5—5 in FIGURE 3.
FIGURE 6 is a horizontal sectional view as seen from the plane 6—6 in FIGURE 3.
FIGURE 7 is an enlarged view with certain parts removed corresponding to the lower portion of FIGURE 3.
FIGURE 8 is an enlarged view corresponding to the lower portion of FIGURE 1.
FIGURE 9 is an enlarged end elevational view of one of the adjusting screws comprising a part of the embodiment.
FIGURE 10 is an enlarged view of one end of a clamping screw.
FIGURE 11 is a perspective view of a tool-holding member.
FIGURE 12 is a perspective view of one of the cover plates having tool adjustment indicating means.

In accordance with the invention, the device, generally indicated by reference character 10, comprises broadly: a frame element 11, a shank element 12, tool supporting elements 13 and 14, a tool clamping element 15, tool adjusting means 16 and 17, scale means 18, and pilot means 19.

The frame element 11 is preferably formed by machining a rectangular block of steel, and is bounded by a forward surface 20, a rearward surface 21, and surfaces 23 and 24, and upper surface 25, and a lower surface 26.

Machined into the forward surface 20 is a transversely extending slot 28 bounded by an upper surface 29 and a lower surface 30. Disposed above the slot 28 are a pair of circular bores 31 and 32 forming clearance holes for the ends of tools positioned within the device. A threaded bore 33 forms means for mounting the tool clamping element 15, as will more fully appear hereinafter.

Extending into the rearward surface 21 is a rectangular recess 35 bounded by sidewalls 36 and 37, an inner wall 38, and an upper wall 39. The wall 39 includes a curved recess 40 of arcuate configuration, having a center of curvature in the axis of the threaded bore 33. Interconnecting the sidewalls 36 and 37 is a transverse brace 41 maintained in position by bolts 42 extending through the body of the frame element 11.

The shank element 12 includes an enlarged boss 44 from which a tapered shank 45 extends, the shank 45 having an end 46 engageable in a machine tool (not shown). The shank element 12 may be formed either integrally with the frame element 11, or interconnected therewith by threaded means or welding (not shown).

The tool supporting elements 13 and 14, are similar and symmetrically positioned, and accordingly a detailed description of one of said elements will serve to describe the other.

As mentioned hereinabove, the supporting elements 13 and 14 employ conventional elongated cutting tools 47 which are suitably ground at the exposed ends thereof depending upon the type of cutting operation involved.

Each of the elements 13–14 includes a rectangularly shaped tool holder 48 bounded by an outer surface 49 having an index mark 50 thereon, side surfaces 51 and 52, an upper surface 53, a lower surface 54, and a curved clearance surface 55. Extending into the body of the holder is a rectangular groove 56, the dimensions of which correspond to the cross-sectional shape of the respective tool 57, the groove 56 being bounded by an inner wall 57, and sidewalls 58 and 59. A threaded bore 60 extends through the body of the holder 58 to provide means for engaging the respective tool adjusting means 16–17.

The tool-clamping element 15 is of a type similar to that disclosed in my above-mentioned Patent No. 3,127,663. It includes a clamping member 61 bounded by an outer surface 62, a cam engaging surface 63, an inner surface 64 having a groove 65 to accommodate the pilot means 19, and side surfaces 66 and 67. A clearance groove 68 engages a surface of the brace 41, the groove 68 being bounded by a bottom surface 69.

Engaging the threaded bore 33 is a threaded bolt 70, which passes through a washer 71 having a circular surface 72 and a flat camming surface 73 which rides over the surface 63. Tightening of the bolt 70 forces the inner surface 64 against the tools supporting elements 13–14 to support the tools against movement, which is the principal strain to which the tools are subjected during use. The tool adjusting means 16 and 17 are also similar and symmetrical, and accordingly a detailed description of one of such means will serve to describe the other.

Threaded screws 76 extend through unthreaded bores in the frame element 11, the head portions 76a thereof being completely surrounded by cover plates 77. The plates 77 are generally rectangular in configuration, being bounded by side surfaces 78, end surfaces 79, an inner surface 80 and an outer surface 81. Adjacent the ends thereof are a pair of countersunk bores 82 of relatively small diameter, and centrally disposed is a countersunk bore 83 of larger diameter having an inner countersunk portion 84 and an outer countersunk portion 85. A circular scale member 86 is positioned within the outer countersunk portion 85, and cooperates with an index member 87 fixed for rotation within the bore 83 by a pair of projections 88. The projections 88 engage milled recesses 89 in the head 76a so as to rotate therewith. A central opening 90 is provided in the index member 83 to permit access to the polygonally shaped recess in the head 76a, so that during rotation the index mark 91 may cooperate with indicia on the scale member 86. By making the thread on the bolt 76 of relatively fine pitch, adjustments of as little as one thousandths of an inch are possible.

The scale means 18 is in the form of a metallic plate, and is fastened by screws 95 to the frame element 11. It includes first and second scales 96 and 97, respectively which cooperate with the index marks 50 on the tool holders 48. The scales 96 and 97 preferably start at a minimum diameter, as for example one inch, and extend radially outwardly to the maximum diameter possible. Rough adjustment to the nearest sixteenth of an inch is made by use of the scales 96 and 97 cooperating with the index marks 50, while fine adjustments are obtained using the index marks 91.

The pilot means 19 includes a pilot supporting structure 100, preferably formed integrally with the frame element 11, and having a bore 102 in line with the shank 45, supporting a cylindrically shaped pilot 103, which is fixed therein by a cooperating set screw 104. In this manner, the pilot 103 may be removed when its use is unnecessary or undesirable, enabling the tool to be used without the same.

The operation of the device is exactly the same as that disclosed in my former Patent No. 3,127,663, but in the case of the present construction, adjustment is made by inserting a hex wrench through the openings 90 after first loosening the clamping element 15 to obtain adjustment of the two elements, as opposed to forming combinations of spacer members, which permit only relatively fixed increments of adjustment.

When the device is used as a trepanning drill, the tools are ground so that each will cut half of the groove on opposite sides thereof.

I wish it to be understood that I do not consider the invention limited to the precise details of structure shown and set forth in this specification, for obvious modifications will occur to those skilled in the art to which the invention pertains.

I claim:

1. In a machining tool holder, a frame element, machine engaging means disposed upon said frame element, said machine engaging means having a principal axis, there being a generally rectangularly shaped recess in said frame element having a principal plane parallel to said principal axis of said machine engaging means; a pair of tool supporting elements arranged for sliding movement in mutually parallel relation within said recess, a pair of elongated cutting tools each supported by one of said tool supporting elements, threaded means for regulating said sliding movement, and clamping means having a line of action perpendicular to said sliding movement for simultaneously clamping said tools against movement from a given adjustment.

2. Structure in accordance with claim 1, in which said threaded means include an index bearing member, and a dial surrounding said index having means for indicating predetermined incremental rotation thereof.

3. Structure in accordance with claim 1, in which said tool supporting elements are provided with index means, a scale plate carried by said frame element, said scale plate having indices thereon cooperating with said last mentioned index means.

References Cited

UNITED STATES PATENTS

| 733,821 | 7/1903 | Dixon | 77—79 |
| 2,225,224 | 12/1940 | Landrum | 145—121 |
| 2,677,887 | 5/1954 | Saboda | 77—79 X |
| 3,306,138 | 2/1967 | Deming | 145—121 X |

FOREIGN PATENTS

| 681,329 | 10/1952 | Great Britain. |

FRANCIS S. HUSAR, *Primary Examiner.*